United States Patent
Osawa et al.

(10) Patent No.: US 7,271,955 B2
(45) Date of Patent: Sep. 18, 2007

(54) TRANSMISSION SCREEN

(75) Inventors: Futoshi Osawa, Shinjuku-Ku (JP); Makoto Honda, Shinjuku-Ku (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 107 days.

(21) Appl. No.: 10/517,334

(22) PCT Filed: Mar. 18, 2004

(86) PCT No.: PCT/JP2004/003646
§ 371 (c)(1), (2), (4) Date: Dec. 9, 2004

(87) PCT Pub. No.: WO2004/083955
PCT Pub. Date: Sep. 30, 2004

(65) Prior Publication Data
US 2005/0237611 A1    Oct. 27, 2005

(30) Foreign Application Priority Data
Mar. 20, 2003 (JP) .............................. 2003-077812

(51) Int. Cl.
*G03B 21/60* (2006.01)
(52) U.S. Cl. .................. 359/453; 359/457; 359/460
(58) Field of Classification Search ................ 359/460, 359/455–457, 453, 443, 452
See application file for complete search history.

(56) References Cited
U.S. PATENT DOCUMENTS 6,417,966 B1* 7/2002 Moshrefzadeh et al. .... 359/453
6,822,792 B2* 11/2004 Goto ........................ 359/456
6,995,907 B2* 2/2006 Osawa et al. .............. 359/460
7,050,227 B2* 5/2006 Olofson et al. ............ 359/443
2002/0191283 A1* 12/2002 Browning .................. 359/460

FOREIGN PATENT DOCUMENTS

| JP | 11-223879 | 8/1999 |
|---|---|---|
| JP | 2000-112036 | 4/2000 |
| JP | 2002-350607 | 12/2002 |
| JP | 2003-050426 | * 2/2003 |
| JP | A-2003-057416 | 2/2003 |

* cited by examiner

Primary Examiner—W. B. Perkey
Assistant Examiner—Robert C. Do
(74) Attorney, Agent, or Firm—Oliff & Berridge, PLC

(57) ABSTRACT

A transmission screen is capable of preventing the reduction of contrast in images due to external light such as emitted by internal lighting fixtures. The transmission screen includes a Fresnel lens sheet having a front surface facing the viewer and provided with Fresnel lens elements, and a shading sheet 13 placed contiguously with the front surface of the Fresnel lens sheet. The shading sheet 13 is provided with shading elements 22 for absorbing external light fallen on the front surface of the shading sheet 13 and reflected in a total reflection mode by the back surface of the Fresnel lens sheet facing a projection light source toward the viewer. Preferably, the shading elements 22 transmit at least external light fallen on the shading sheet at an incident angle θ satisfying a condition expressed by: θ<24+0.018×F, where θ is incident angle of external light that falls on the shading sheet, and F is the focal length of the Fresnel lens elements in millimeter.

4 Claims, 7 Drawing Sheets

TRANSMISSION SCREEN

BACKGROUND OF THE INVENTION

1. Technical Field

The present invention relates to a transmission screen preferably employed in a rear projection display or the like provided with a CRT, a liquid crystal light bulb or a DLP as a light source. More particularly, the present invention relates to a transmission screen capable of preventing the reduction of contrast by external light.

2. Background Art

Studies have been made to suppress the reduction of contrast in images displayed on a rear projection television (hereinafter, abbreviated to "PTV"). Unnecessary stray light produced by reflecting image light emitted by a projection light source by lens elements included in the transmission screen and emitted toward the viewer and external light emitted by lighting fixtures, fallen on the transmission screen and reflected toward the viewer are representative factors of the reduction of contrast in images displayed by the PTV.

The former factor can be eliminated to suppress the reduction of contrast in images by a method disclosed in, for example, Patent document 1 that places a light-absorbing member or a light scattering member on the plane surface of a Fresnel lens sheet included in the transmission screen to absorb or scatter unnecessary light. Another method of eliminating the former factor to suppress the reduction of contrast in images disclosed in, for example, Patent document 2 forms a light-absorbing part in or disperses a light-absorbing material in a Fresnel lens sheet included in the transmission screen to absorb unnecessary light by the light-absorbing part or the light-absorbing material.

The latter factor can be eliminated to suppress the reduction of contrast in images by incorporating a Fresnel lens sheet provided with an antireflection coating into a transmission screen to suppress the reflection of external light or by incorporating a Fresnel lens sheet containing a light-absorbing material into a transmission screen to suppress the reflection of external light.

Patent document 1: JP 4-163539 A (FIG. 1)
Patent Document 2: JP 6-148407 (FIGS. 2 and 4)

DISCLOSURE OF THE INVENTION

In most cases, the PTV is installed in the room of the house. Therefore, external light emitted by lighting fixtures is an unignorable factor of the reduction of contrast in images displayed by the PTV and it is an important problem to suppress the reduction of contrast attributable to such external light.

A Fresnel lens sheet provided with an antireflection coating is costly and hence such a Fresnel lens sheet is not necessarily a preferable means for solving the problem from the viewpoint of cost balance. A Fresnel lens sheet containing a light-absorbing material needs to contain a large amount of the light-absorbing material to suppress the reduction of contrast satisfactorily. A large light-absorbing material content reduces the transmittance of the Fresnel lens sheet and hence dark images are displayed inevitably.

When the PTV provided with a transmission screen including a Fresnel lens sheet as a component sheet was viewed under ordinary illuminating condition illuminated by interior lighting fittings, a white band having the shape of a circular arc could be recognized in a region above the center of the transmission screen and the deterioration of images due to the reduction of contrast was confirmed. Such a problem was caused by the total reflection of illuminating light (external light) fallen at a certain incident angle on the transmission screen toward the viewer.

The present invention has been made to solve such a problem and it is therefore an object of the present invention to provide a transmission screen capable of preventing the reduction of contrast due to external light, such as light emitted by interior lighting fixtures.

The present invention provides a transmission screen including: a Fresnel lens sheet having a front surface facing the viewer and provided with Fresnel lens elements, and a shading sheet placed contiguously with the front surface of the Fresnel lens sheet; wherein the shading sheet is provided with shading elements for absorbing external light fallen on the front surface of the shading sheet and completely reflected by the back surface of the Fresnel lens sheet facing a projection light source toward the viewer.

According to the present invention, the shading elements of the shading sheet absorbs external light fallen on the front surface of the shading sheet and completely reflected by the back surface of the Fresnel lens sheet facing the projection light source toward the viewer. Thus the amount of external light that falling on the front surface of the transmission screen and being completely reflected toward the viewer by the back surface of the Fresnel lens sheet on the side of the projection light source can be reduced, and the amount of the external light completely reflected toward the viewer can be reduced to the least possible extent. Consequently, it is possible to prevent the deterioration of resolution due to the reduction of contrast caused by external light, such as illuminating light emitted by interior lighting fixtures.

In the transmission screen according to the present invention, the shading elements transmit external light fallen on the shading sheet at an incident angle $\theta$ meeting Expression (1)

$$\theta < 24 + 0.018 \times F \tag{1}$$

where $\theta$ is incident angle of external light that falls on the shading sheet, and F is the focal length of the Fresnel lens elements.

Since the shading sheet is provided with the shading elements that transmit external light fallen on the shading sheet at an incident angle $\theta$ meeting Expression (1), at least external light that penetrates the shading sheet, i.e., external light that is not absorbed by the shading elements, is not completely reflected by the back surface of the Fresnel lens sheet on the side of the projection light source. Therefore, contrast is not reduced by external light and the deterioration of resolution can be prevented even if external light fall on the transmission screen such that external light falling on the shading sheet at an incident angle meeting Expression (1) is not trapped by the shading elements and penetrates the Fresnel lens sheet.

In the transmission screen according to the present invention, the shading sheet has a rib group including a plurality of ribs extending in a direction and the shading elements, each of the shading elements has a total-reflection facet contiguous with the rib and capable of reflecting image light fallen on the back surface of the Fresnel lens sheet on the side of the projection light source in a total reflection mode toward the viewer, and the shading elements are light-absorbing parts containing a light-absorbing material.

According to the present invention, the light-absorbing parts containing the light-absorbing material serve as the shading elements and absorb external light fallen on the front surface of the transmission screen on the viewer's side and may be possibly completely reflected by the back surface of the Fresnel lens sheet on the side of the projection light source. Therefore, external light completely reflected by the back surface of the Fresnel lens sheet on the side of the projection light source toward the viewer can be reduced to the least possible extent. Consequently, it is possible to prevent the deterioration of resolution due to the reduction of contrast caused by external light such as light emitted by interior lighting fixtures.

In the transmission screen according to the present invention, the light-absorbing material is prepared by dispersing light-absorbing particles in a substantially transparent second resin having a refractive index smaller than that of a first resin forming the ribs.

According to the present invention, the light-absorbing material contained in the light-absorbing parts serving as the shading elements is prepared by dispersing the light-absorbing particles in the substantially transparent second resin having a refractive index smaller than that of the first resin forming the ribs. Therefore, external light fallen on the transmission screen is absorbed directly by the light-absorbing material contained in the light-absorbing part or travels through the shading sheet, is refracted at the boundary between the light-absorbing parts and the ribs, penetrates into the light-absorbing part and is absorbed by the light-absorbing material.

In the transmission screen according to the present invention, the shading sheet faces the viewer and the front surface of the shading sheet on the viewer's side is coated with an antireflection layer or a hard coating layer.

According to the present invention, the antireflection layer formed on the front surface of the shading sheet suppresses the reflection of external light fallen on the shading sheet or the hard coating layer formed on the front surface of the shading sheet improves the abrasion resistance and durability of the shading sheet, whereby the reduction of resolution due to the reduction of contrast caused by external light can be prevented for a long time.

In the transmission screen according to the present invention, a lenticular lens sheet is sandwiched between the shading sheet and the Fresnel lens sheet, the lenticular lens sheet is provided with lenticular lens elements arranged along a direction, and the back surface of the shading sheet on the side of the projection light source and the front surface of the lenticular lens sheet on the viewer's side are adhesively joined together such that the direction along which the lenticular lens elements are arranged and the direction along which the ribs are arranged are perpendicular to each other.

BEST MODE FOR CARRYING OUT THE INVENTION

A transmission screen in a preferred embodiment according to the present invention will be described with reference to the accompanying drawings.

Figure 1:
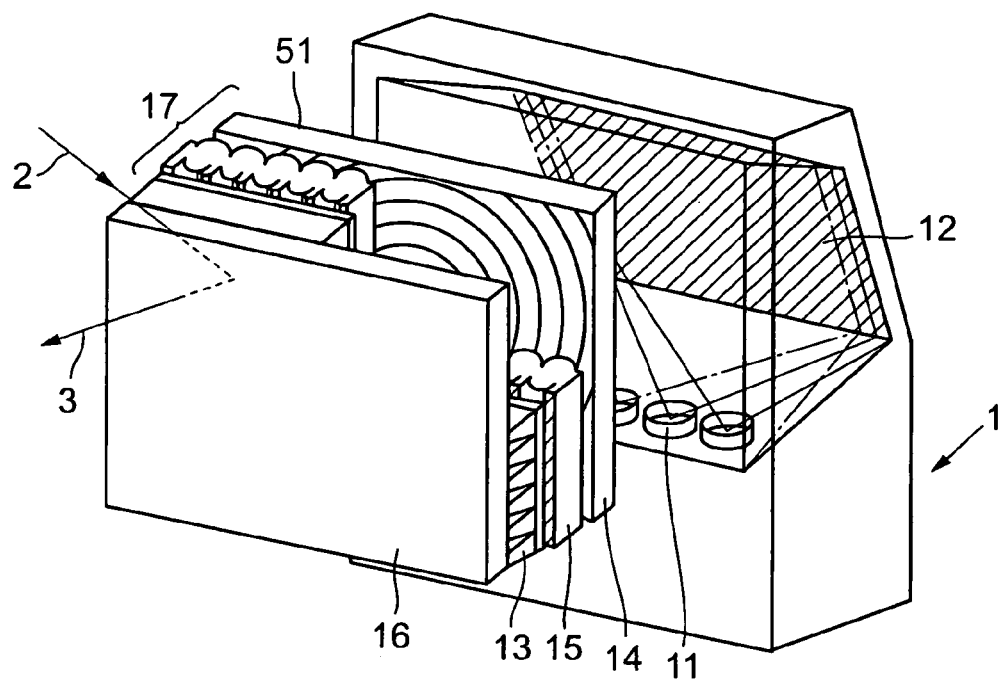
FIG. 1 is a view of a PTV provided with a transmission screen according to the present invention by way of example.
Figure 2:
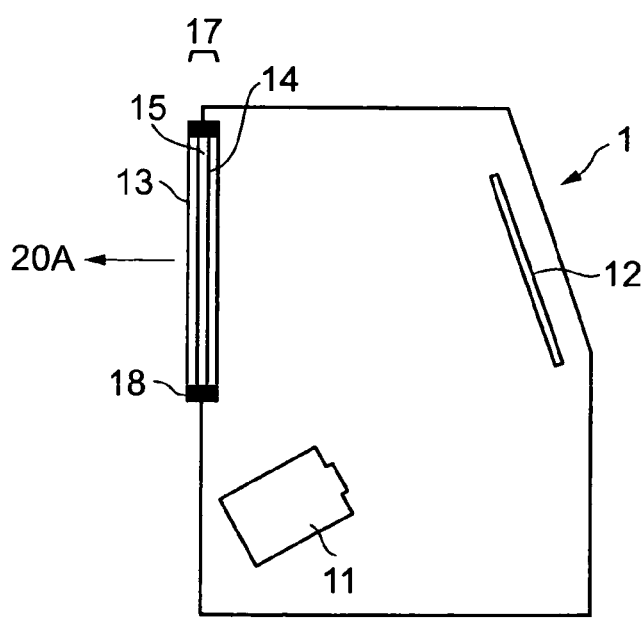
FIG. 2 is a typical side elevation of the PTV shown in FIG. 1.

FIG. 1 is a view of a PTV 1 provided with a transmission screen 17 according to the present invention b and FIG. 2 is a typical side elevation of the PTV 1.

A frame 18 holding the transmission screen 17 is attached to the front of the PTV 1 on the viewer's side 20A. The PTV 1 is internally provided with a projection light source including R, G and B CRTs. As shown in FIGS. 1 and 2, projected light, namely, image light, projected by the projection light source 11 is reflected by a mirror 12 toward the back surface of the transmission screen 17 including at least a shading sheet 13 and a Fresnel lens sheet 14.

As shown in FIG. 1, the transmission screen 17 of the present invention includes at least the Fresnel lens sheet 14 provided with Fresnel lens elements on its front surface on the viewer's side, and the shading sheet 13 disposed on the viewer's side of the Fresnel lens sheet 14. The present invention is characterized in that the shading sheet 13 disposed on the viewer's side of the Fresnel lens sheet 14 is provided with shading elements 22 for absorbing external light 2 coming from the viewer's side and fallen on the transmission screen 17 and completely reflected by the back surface on the side of the projection light source toward the viewer's side.

As shown in FIG. 1, it is preferable that the Fresnel lens sheet 14 is a circular Fresnel lens sheet. A double-sided lenticular lens sheet 15 provided with light-absorbing parts having the shape of stripes on its front surface on the viewer's side may be sandwiched between the shading sheet 13 and the Fresnel lens sheet 14. The front surface of the shading sheet 13 on the viewer's side may be coated with a functional layer 16, such as an antireflection layer or a hard coating layer.

Fresnel Lens Sheet

Preferably, the Fresnel lens sheet 14 included in the transmission screen 17 is a Fresnel lens sheet provided with circular Fresnel lens elements on the front surface on the viewer's side. There are various possible Fresnel lens sheets specified by specifications including size and aspect ratio. There are various possible Fresnel lens sheets having different focal lengths F. For example, an example, which will be described later, is specified by screen size of 46 in. (aspect ratio: 4:3), focal lengths F in the range of 700 to 900 mm and F2 of 9800 mm. Symbol F indicates the focal lengths of the Fresnel lens elements, symbol F1 indicates the distance between the projection light source and the Fresnel lens sheet, and symbol F2 indicates the distance between the Fresnel lens sheet and an image-forming plane. F, F1 and F2 meet a relation expressed by: $1/F=1/F1+1/F2$.

Shading Sheet

Figure 3:
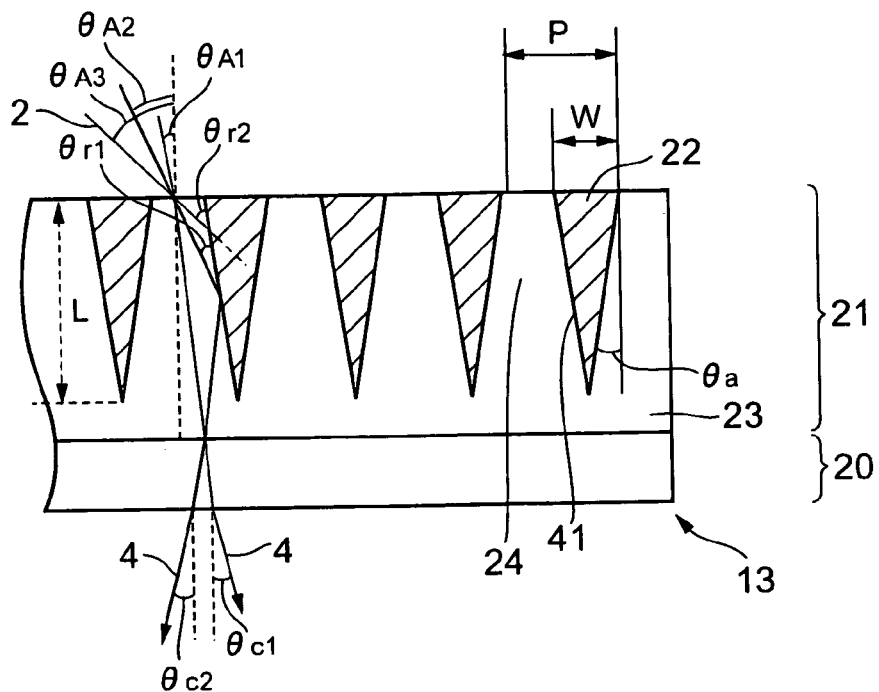
FIG. 3 is a typical sectional view of shading elements in an example formed on a shading sheet.
Figure 4:
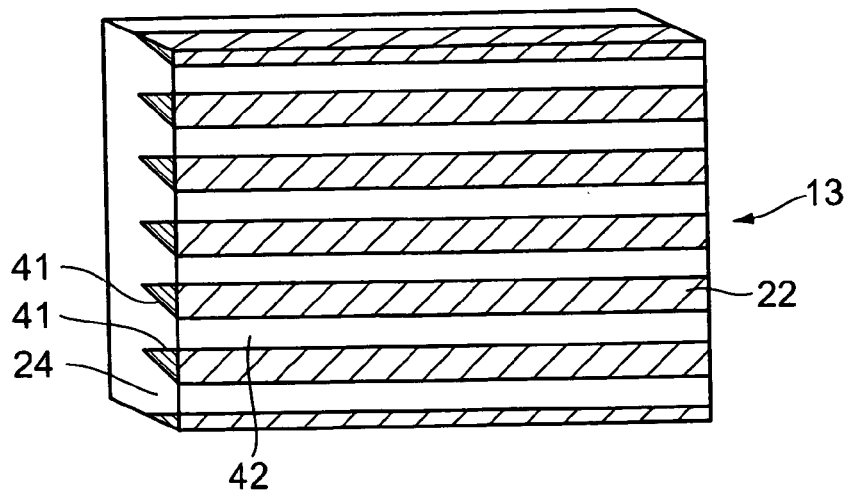
FIG. 4 is a perspective view of the shading sheet shown in FIG. 3.
Figure 6:
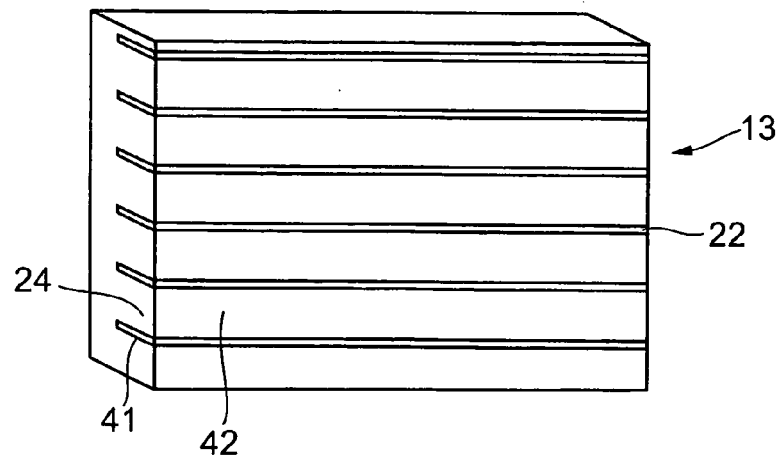
FIG. 6 is a perspective view of the shading sheet shown in FIG. 5.

FIGS. 3 and 4 are typical sectional views of a shading part 21 included in the shading sheet 13. FIGS. 4 and 6 are perspective views of the shading sheets 13. The shading sheet 13 is built by forming the shading part 21 having shading elements 22 on a substantially transparent base sheet 20.

The shading part 21 has a rib group of a plurality of ribs 24 extending in a direction, and shading elements 22 interposed between the adjacent ribs 24. Each of the ribs 24 has a total-reflection facet 41 that reflect image light coming from the side of the projection light source completely toward the viewer's side.

The shading elements 22 of the present invention are disposed on the viewer's side of the Fresnel lens sheet 14. The shading elements 22 absorb part of external light 2 coming from the viewer's side and completely reflected by the back surface 51 of the Fresnel lens sheet 14 on the side of the projection light source toward the viewer's side. The shading elements 22 may be light-absorbing parts containing a light-absorbing material and having a V-shaped cross section as shown in FIG. 3, or may be light-absorbing parts containing a light-absorbing material and having a straight cross section as shown in FIG. 5.

Figure 5:
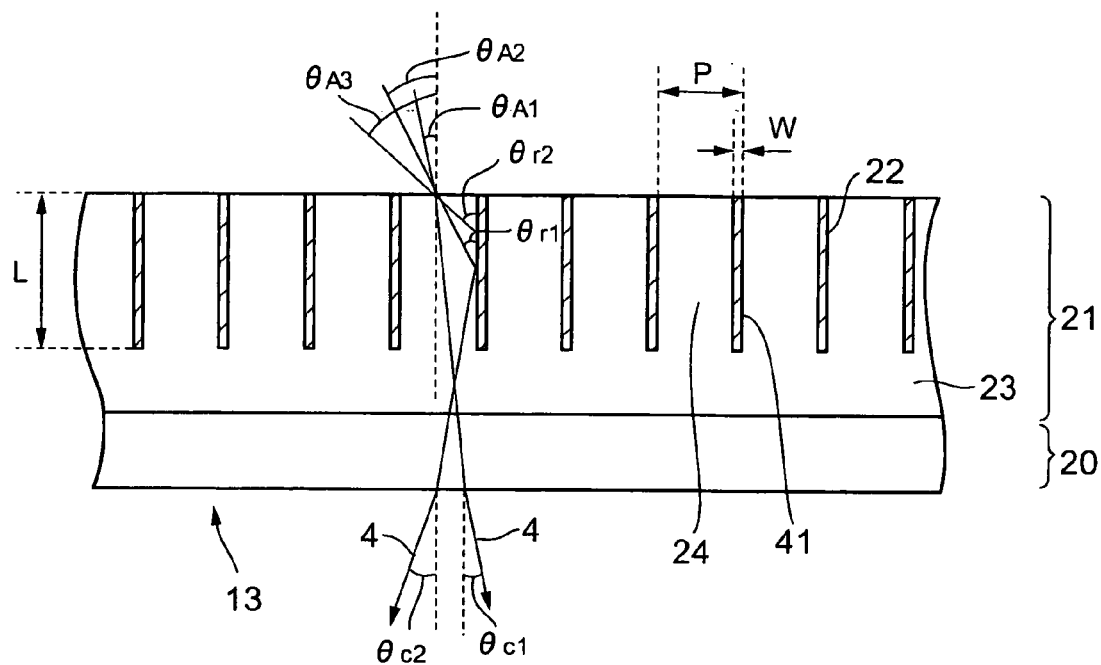
FIG. 5 is a typical sectional view of shading elements in another example formed on a shading sheet.

As shown in FIGS. 3 and 5, the shading elements 22 absorb part of external light coming from the viewer's side, fallen on the shading sheet 13, traveled through the shading sheet 13, reading the back surface 51 of the Fresnel lens sheet 14 on the side of the projection light source and completely reflected by the back surface 51 of the Fresnel lens sheet 14 toward the viewer's side.

The external light travels through the shading sheet 13 having such a function along one of three optical paths, namely, first, second and third paths, as shown in FIGS. 3 and 5 depending on the refractive indices of the materials forming the shading sheet 13.

External light 2 travels along the first optical path when the external light 2 falls on the shading sheet 13 at an incident angle $\theta_{A1}$. The external light 2 does not fall on the total-reflection facets 41, penetrates through the shading part 21 and the base sheet 20, and leaves the base sheet 20 in a direction inclined at an angle $\theta_{C1}$ to a normal to the back surface of the base sheet 20. External light 2 travels along the second optical path when the external light 2 falls on the shading sheet 13 at an incident angle $\theta_{A2}$. The external light 2 falls on the total-reflection facets 41 at an angle $\theta_{r1}$ to the total-reflection facets. If the angle $\theta_{r1}$ is not greater than the critical angle dependent on the difference between the respective refractive indices of the ribs 24 and the shading elements 22, the external light 2 is reflected completely from the total-reflection facets 41 and leaves the base sheet 20 in a direction inclined at an angle $\theta_{C2}$ to a normal to the back surface of the base sheet 20. External light 2 travels along the third optical path when the external light 2 falls on the shading sheet 13 at an incident angle $\theta_{A3}$. The external light 2 falls on the total-reflection facets 41 at an angle $\theta_{r2}$. If the angle $\theta_{r2}$ is not smaller than the critical angle, the external light 2 is refracted at the total-reflection facets 41, penetrates into the shading elements 22 and is absorbed by the shading elements 22.

Parameters specifying the properties of the shading sheet 13 include the width W of the shading elements 22, the pitch P of the shading elements 22, the depth L of the shading elements 22, the refractive indices of the resins forming the shading sheet 13 and the inclination $\theta_\alpha$ of the total-reflection facets 41. The values of the parameters are determined properly so that the condition expressed by Expression (1) may be satisfied.

For a more specific description, it is desirable to take into consideration the refractive index of the resin forming the Fresnel lens sheet 14 and the inclination of the lens facets of the Fresnel lens elements formed on the front surface on the viewer's side of the Fresnel lens sheet 14. The shape and materials of the shading sheet 13 are designed such that external light 4 that will fall on the back surface 51 of the Fresnel lens sheet 14 on the side of the projection light source at incident angles not smaller than critical angle on the back surface 51 is unable to reach the Fresnel lens sheet 14. Values of parameters specifying the shape of the Fresnel lens sheet 14 can be determined through simulation based on the effective idea of the present invention.

The shading elements 22 are designed such that at least the external light completely reflected toward the viewer's side by the back surface 51 of the Fresnel lens sheet on the side of the projection light source is absorbed. The shading elements 22 may be designed such that external light that is not reflected by the back surface 51 on the projection light source of the Fresnel lens sheet 14 and may be absorbed by the internal walls of the PTV 1 penetrates through the shading elements 22.

More concretely, it is preferable that the shading elements 22 transmits external light fallen on the shading sheet 13 at an incident angle $\theta$ ($=\theta_{Ano}$) satisfying Expression (1) and refracted, or external light penetrated, completely reflected and refracted. In Expression (1), $\theta_{An}$ is the angle (degree) of external light that falls on the shading sheet, and F is the focal length (mm) of the Fresnel lens elements. External light penetrated into the shading sheet at an angle satisfying Expression (1) and refracted in the shading sheet 13 is not absorbed by the shading elements 22 and penetrates through the shading sheet 13. However, external light 4 penetrated through the shading sheet 13 is not completely reflected by the back surface 51 of the Fresnel lens sheet 14 on the side of the projection light source. Therefore, the external light 4 that is not absorbed by the shading elements 22 does not cause the reduction of contrast in images displayed on the transmission screen 17 and the deterioration of resolution can be prevented. Eventually, the external light 4 penetrates through the transmission screen 17 and is absorbed by the black interior walls of the PTV.

Figure 7:
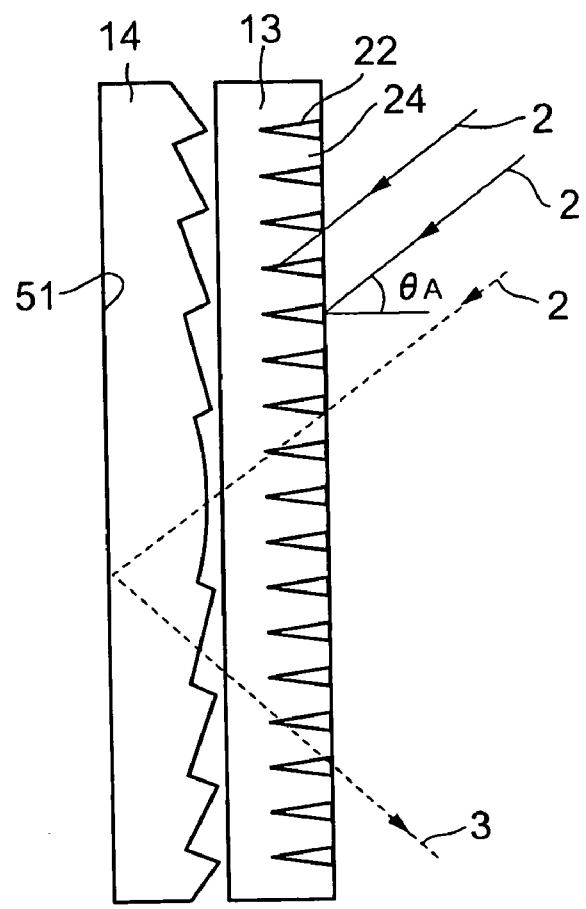
FIG. 7 is a view of assistance in explaining a mode of absorbing external light fallen on the transmission screen according to the present invention.

FIG. 7 is a view of assistance in explaining a mode of absorbing external light 2 that will be completely reflected by the back surface 51 of the Fresnel lens sheet 14 on the side of the projection light source unless the shading sheet 13 is used by the shading elements 22 of the shading sheet 13 disposed on the viewer's side of the Fresnel lens sheet 14. The shading sheet 13 may transmit external light 2 that falls on the shading sheet 13 at angles smaller than the minimum angle of external light 2 that is reflected completely by the back surface 51 of the Fresnel lens sheet 14 on the side of the projection light source. The external light 2 penetrated through the shading sheet 13 is not reflected completely by the back surface 51 of the Fresnel lens sheet 14 on the side of the projection light source and is absorbed by the interior walls of the PTV 1.

thus the shading elements 22 can reduce the external light 2 that falls on the shading sheet at incident angles such that the external light 2 is completely reflected by the back surface 51 of the Fresnel lens sheet on the side of the projection light source to the least possible extent. Consequently, external light that is reflected completely toward the viewer's side can be reduced to the least possible extent.

Values of parameters specifying the shape of the shading elements 22 can be determined through simulation based on the effective idea of the present invention. For example, when the shading sheet is formed of a resin having a refractive index of 1.55 in an example, which will be described later, in which screen size is 46 in. (aspect ratio: 4:3), F2 is 9800 mm and F (focal length) is between 700 and 900 mm, design values may be between 25 and 210 µm for the width W of the shading elements 22, between 50 and 300 µm in the pitch P of the shading elements 22, between 63 and 900 µm for the depth L of the shading elements 22, and between 5° and 10° for the inclination $\theta_\alpha$ of the total-reflection facets 41.

A preferable light-absorbing material for forming the shading elements 22 is prepared by dispersing light-absorbing particles in a substantially transparent second resin having a refractive index smaller than that of a first resin 23 forming the ribs 24. There are not particular restrictions on the composition of the light-absorbing material and any one of various light-absorbing materials may be used provided that the light-absorbing material is capable of achieving the object of the present invention. The light-absorbing material directly absorbs external light fallen on the transmission screen 17 or absorbs external light that travels through the shading sheet 13 without being completely reflected by the boundaries between the shading elements 22 and the ribs 24, is refracted in the shading elements 22 and penetrates into the shading elements 22. The resin having a small refractive index and forming the shading elements 22 may colored by adding a dye having a light-absorbing effect to the resin.

Light projected by the projection light source, deflected by the Fresnel lens sheet 14 and fallen perpendicularly on the back surface of the shading sheet 13 travels through the shading sheet 13 without falling on the total-reflection facets 41 or is reflected completely by the boundaries between the ribs 24 and the shading elements 22 owing to the difference in refractive index between the resin forming the shading elements 22 and the resin forming the ribs 24 and travels through the shading sheet 13.

Preferably, the shading elements 22 as light-absorbing parts have an achromatic color, such as black or gray, but the color of the shading elements 22 is not limited thereto. The shading elements 22 may be formed of a material capable of selectively absorbing light of specific wavelengths. The light-absorbing particles contained in the shading elements 22 may be those of carbon black, graphite or a metal salt, such as a black iron oxide, colored organic particles or colored glass beads. A dye for coloring the shading elements 22 may be an acid red xanthene organic dye or an organic acid salt of neodymium, such as neodymium carboxylate.

The shading sheet 13 having the shading elements 22 can be fabricated by forming the ribs 24 by known method using a forming mold, such as a hot-press forming method, a thermal polymerization method or a radiation curing method, and filling up grooves having a V-shaped cross section or a straight cross section between the ribs 24 with a light-absorbing material by a suitable method, such as a wiping method.

It is preferable from the view point of facilitating fabrication to form the ribs 24 of a radiation-curable resin. The radiation-curable resin may be any one of those generally used in this technical field such as UV-curable resins including acrylic resins, epoxy resins and urethane resins, and electron radiation-curable resins. The substantially transparent base sheet 20 of the shading sheet 13 may be any one of generally used films or sheets, such as polyester films and polycarbonate films.

Functional Layer and Front Sheet

Figure 8:
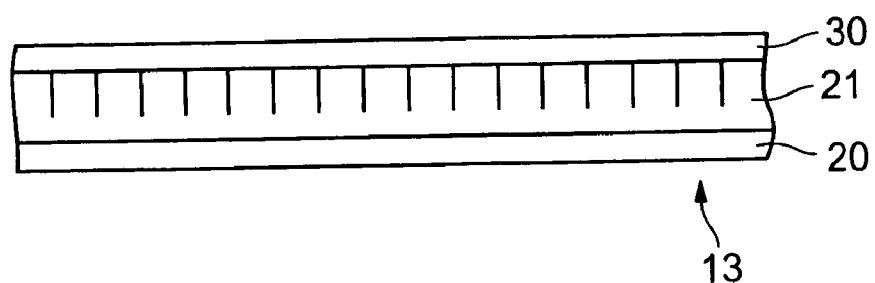
FIG. 8 is a sectional view of an example of a shading sheet provided with a functional layer on its front surface on the viewer's side.

FIG. 8 shows a shading sheet 13 provided with a functional layer 30 on its front surface on the viewer's side by way of example. The functional layer 30 is an antireflection layer, a hard coating layer, a glare-proof layer or an antistatic layer. An antireflection layer or a hard coating layer is particularly preferable. An antireflection layer can be formed by applying an antireflection material to the front surface of the shading sheet 13 on the viewer's side. An antireflection layer formed on the shading sheet 13 suppresses the reflection of external light 2 fallen on the shading sheet 13 by the front surface of the shading sheet 13. A hard coating layer can be formed by applying a hard coating material to the front surface of the shading sheet 13 on the viewer's side. The shading sheet 13 having the front surface coated with the hard coating layer is abrasion-resistant and has improved durability. Thus, the hard coating layer enables the shading sheet 13 maintain its effect for a long period of time. Consequently, the deterioration of resolution due to the reduction of contrast caused by external light 2 that falls on the shading sheet 13 can be prevented for a long period of time.

Figure 9:
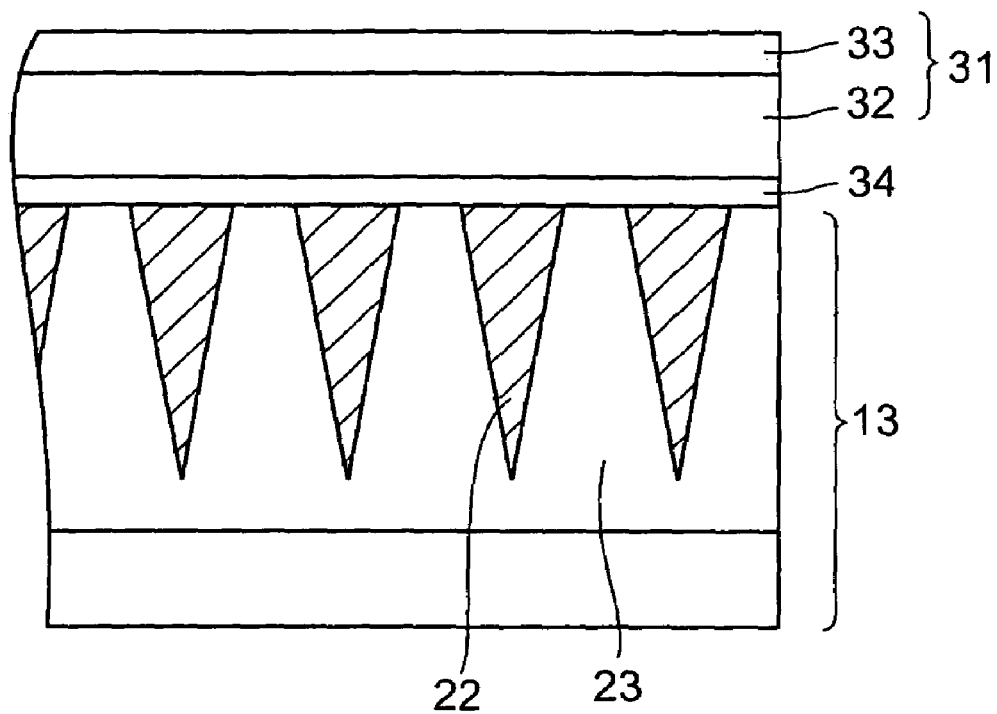
FIG. 9 is a sectional view of an example of a shading sheet provided with affront sheet on its front surface on the viewer's side.

FIG. 9 shows a shading sheet 13 provided with a front sheet 31 on its front surface on the viewer's side. The front sheet 31 includes a base sheet 32 and a functional layer 33 formed on the base sheet 32. The front sheet 31 is bonded to the front surface of the shading sheet 13 on the viewer's side with an adhesive 34. Preferably, the base sheet 32 is an acrylic resin sheet. The functional layer 33 may be an antireflection layer, a hard coating layer, a glare-proof layer or an antistatic layer. Preferably, the adhesive 34 is an acrylic adhesive.

Lenticular Lens Sheet

As shown in FIG. 1, the transmission screen according to the present invention may include three layers, namely, the shading sheet 13, the Fresnel lens sheet 14, and a lenticular lens sheet 15 sandwiched between the shading sheet 13 and the Fresnel lens sheet 14.

Preferably, the lenticular lens sheet 15 is a double-sided lenticular lens sheet provided with lenticular lens elements on both its front surface on the viewer's side and its back surface on the side of the projection light source. The double-sided lenticular lens sheet 15 is provided on its both sides with vertical lenticular lens elements extending along a direction Y and arranged along a direction X parallel to the width of the double-sided lenticular lens sheet 15. Light-absorbing parts, such as black stripes, are formed between the lenticular lens elements arranged on the front surface of the double-sided lenticular lens sheet 15 on the viewer's side to improve contrast by absorbing stray light and external light. The double-sided lenticular lens sheet 15 can be fabricated by a generally known method, such as an extrusion molding method, a hot-press forming method or a radiation-curing method.

Preferably, the front surface of the lenticular lens sheet 15 on the viewer's side and the back surface of the shading sheet 13 on the side of the projection light source are bonded together. It is preferable that the shading sheet 13 and the lenticular lens sheet 15 are bonded together such that a direction along which the ribs 24 are arranged and a direction along which the lenticular lens elements are arranged are perpendicular to each other. Such a method of bonding together the shading sheet 13 and the lenticular lens sheet 15 enables displaying images in very high contrast.

When the lenticular lens sheet 15 is a thin plate of minute construction, the rigidity of the sheet can be increased by bonding the light-absorbing parts (black stripes) to the shading sheet 13.

When the lenticular lens sheet is a lenticular lens sheet having a flat exit surface, such as used when the projection light source of the PTV 1 is a single-tube light source, such as an LCD or a DLP, the front surface of the lenticular lens sheet on the viewer's side can be entirely bonded to the shading sheet 13.

Any one of various diffusing sheets may be sandwiched between the shading sheet 13 and the Fresnel lens sheet 14 instead of the lenticular lens sheet 15. The diffusing sheets are, for example, diffusing plates and lens sheets having ridges of a trapezoidal cross section having side facets capable of reflecting light in a total reflection mode as shown in FIG. 3.

EXAMPLES

Examples of the present invention will be described.

Example 1

A shading sheet 13 for a transmission screen of 46 in. screen size (width: 935 mm, height: 701 mm, aspect ratio: 4:3) was fabricated. Ribs 24 of a trapezoidal cross section were formed of a UV-curable acrylic resin having a refractive index of 1.55 after curing on one surface of a 188 μm thick PET film having a refractive index of 1.65, namely, base film such that grooves of a triangular cross section having opposite side walls inclined at $\theta_\alpha$ of 8° were formed between the adjacent ribs 24. The grooves were filled up with a light-absorbing material to form shading elements 22. The light-absorbing material was prepared by mixing 50% by weight crosslinked acrylic resin particles having a mean particle size of 10 μm in a UV-curable acrylic resin having a refractive index of 1.49. The width W of the shading elements 22 on the front surface of the shading sheet 13 on the viewer's side was 100 μm, the pitch P of the shading elements 22 was 200 μm and the depth L of the shading elements 22 was 340 μm.

A Fresnel lens sheet 14 for the 46 in. transmission screen was fabricated. A UV-curable resin having a refractive index of 1.55 was poured over a Fresnel lens forming mold in a resin layer, and a 2 mm base plate of an acrylonitrile-styrene copolymer having a refractive index of 1.53 was placed on the resin layer. The Fresnel lens sheet 14 was a circular Fresnel lens sheet of 2.2 mm in thickness and 9800 mm in F2 having a flat back surface 51 on the side of the projection light source. The Fresnel lens forming mold was made by machining a workpiece with a cutting tool having a tip angle of 45°.

The Fresnel lens sheet 14 and the shading sheet 13 were joined together to form a transmission screen in Example 1.

Evaluation

The transmission screen in Example 1 was put on a PTV on the market to evaluate the performance thereof. Table 1 shows minimum angles at which external light 2 fallen on the transmission screen in Example 1 was not completely reflected by the back surface 51 of the Fresnel lens sheet 14 on the side of the projection light source.

| Distance from the center (mm) | Focal length F (mm) | | | | |
|---|---|---|---|---|---|
| | 900 | 850 | 800 | 750 | 700 |
| 50 | 65.8 | 65.0 | 64.7 | 64.2 | 63.5 |
| 100 | 58.5 | 57.7 | 57.0 | 56.4 | 55.5 |
| 150 | 53.5 | 52.8 | 52.0 | 51.2 | 50.3 |
| 200 | 49.5 | 48.8 | 48.0 | 47.2 | 46.2 |
| 250 | 46.4 | 45.5 | 44.7 | 43.9 | 42.8 |
| 300 | 43.6 | 43.0 | 42.0 | 41.0 | 40.0 |
| 350 | 41.2 | 40.5 | 39.5 | 38.5 | 37.5 |

Figure 10:
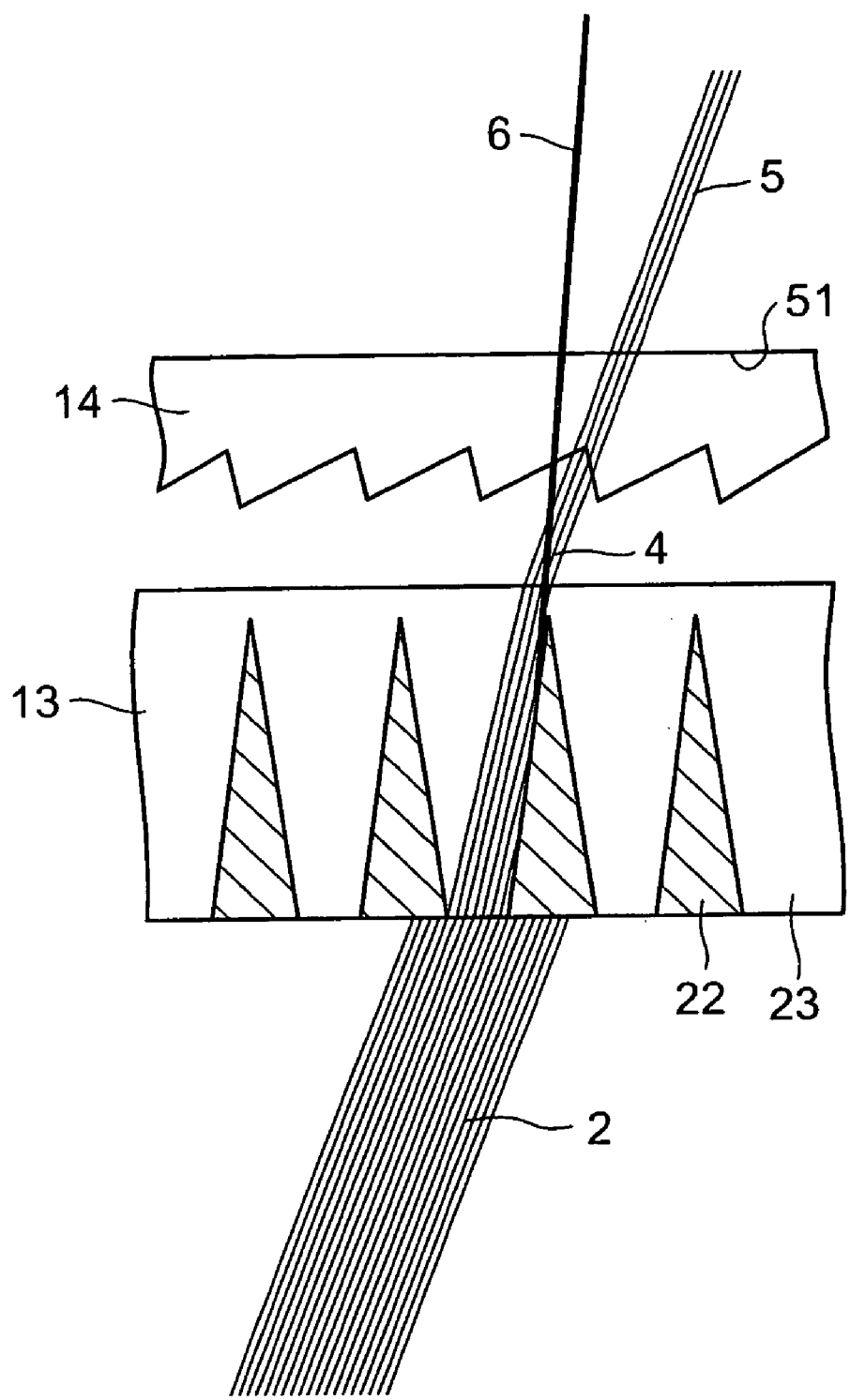
FIG. 10 is an optical path diagram showing optical paths along which external light rays fallen at an incident angle of 20° on a transmission screen in Example 1 travel through a shading sheet.
Figure 11:
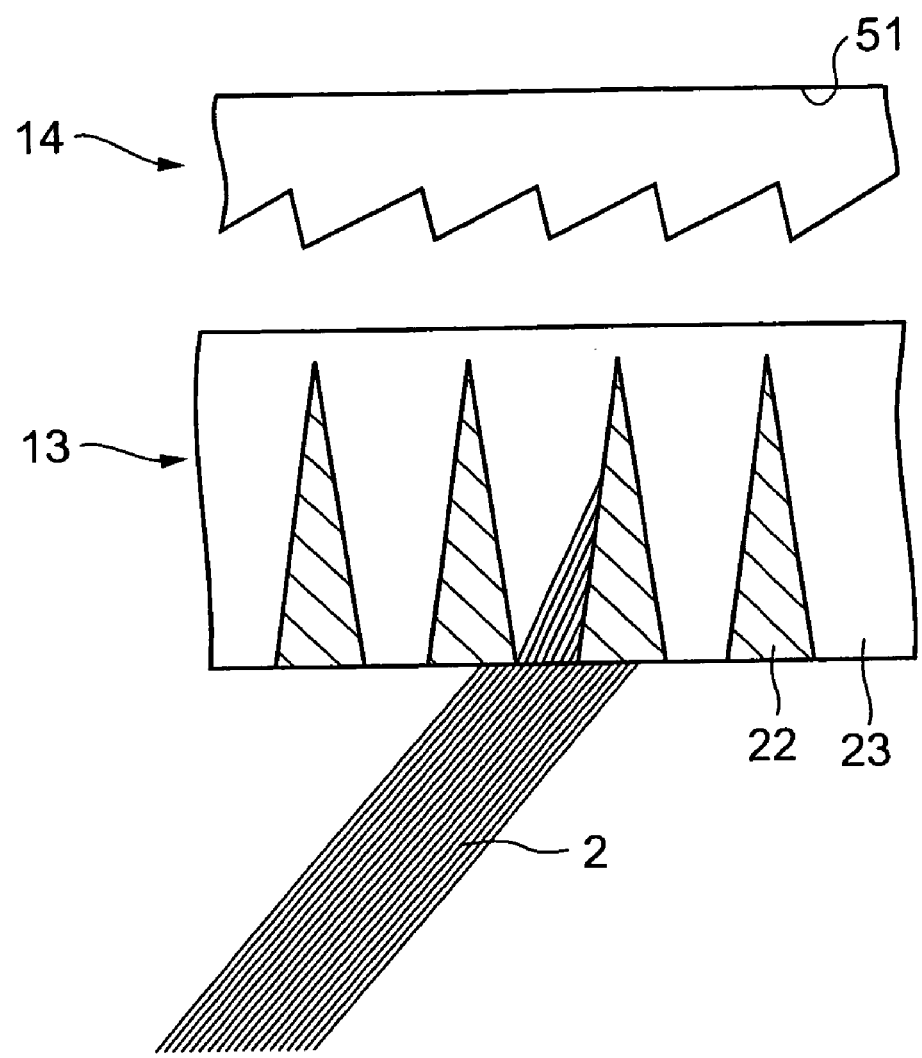
FIG. 11 is an optical path diagram showing optical paths along which external light rays fallen at an incident angle of 40° on the transmission screen in Example 1 travel through the shading sheet.

All the data shown in Table 1 satisfied the condition expressed by $\theta < +0.018 \times F$. FIG. 10 is an optical path diagram showing optical paths along which external light rays fallen at an incident angle of 20° on the transmission screen in Example 1 travel through the shading sheet 13 and FIG. 11 is an optical path diagram showing optical paths along which external light rays fallen at an incident angle of 40° on the transmission screen in Example 1 travel through the shading sheet 13. It is known from FIGS. 10 and 11 that external light 4 that is refracted in and penetrates the shading sheet 13 among the external light 2 fallen on the shading sheet 13 of the transmission screen in Example 1 is not completely reflected by reflected by the back surface 51 of the Fresnel lens sheet 14 on the side of the projection light source and penetrates the Fresnel lens sheet 14. Therefore, external light was not reflected toward the viewer's side and contrast in images displayed on the transmission screen was not reduced.

As apparent from the foregoing description, in the transmission screen of the present invention, the shading elements of the shading sheet absorb external light fallen from the viewer's side on the transmission screen and reflected in a total reflection mode toward the viewer's side by the back surface of the Fresnel lens sheet on the side of the projection light source. Therefore, external light that falls on the transmission screen at incident angles so that the external light may be reflected in a total reflection mode by the back surface of the Fresnel lens sheet on the side of the projection light source can be reduced, and external light that is reflected in a total reflection mode toward the viewer's side can be reduced to the least possible extent. Consequently, it is possible to prevent the deterioration of resolution due to the reduction of contrast caused by external light, such as illuminating light emitted by interior illuminating fixtures.

The shading sheet of the present invention is provided with the shading elements that transmit external light fallen at incident angle P meeting the condition expressed by Expression (1) and refracted by the shading sheet among external light that fall on the shading sheet. Therefore, at least the external light that penetrates the shading sheet, i.e., external light that is not absorbed by the shading element, will not be reflected in a total reflection mode by the back surface of the Fresnel lens sheet on the side of the projection light source. Thus, even if external light falls on the shading sheet at incident angles meeting the condition expressed by Expression 1 and penetrates into the Fresnel lens sheet, contrast will not be reduced by external light and hence the deterioration of resolution can be prevented.

The invention claimed is:
1. A transmission screen comprising:
a Fresnel lens sheet having a front surface facing the viewer and Fresnel lens elements formed on the front surface, and a shading sheet placed contiguously with the front surface of the Fresnel lens sheet;

wherein the shading sheet is provided with shading elements for absorbing external light fallen on the front surface of the shading sheet from a viewer side, wherein the shading elements transmit external light fallen on the shading sheet at an incident angle θ meeting Expression (1) and penetrated into and diffracted by the shading sheet $$\theta < 24 + 0.018 \times F \qquad (1)$$

where θ is incident angle of external light that falls on the shading sheet and F is the focal length of the Fresnel lens elements in millimeter, and wherein the shading sheet has a rib group including a plurality of ribs extending in a direction and the shading elements, wherein each of the shading elements has a total-reflection facet contiguous with the rib and capable of reflecting in a total reflection mode the external light fallen on the front surface of the shading sheet from the viewer side toward the projection light source, and the shading elements are light-absorbing parts containing a light-absorbing material.

2. The transmission screen according to claim 1, wherein the light-absorbing material is prepared by dispersing light-absorbing particles in a substantially transparent second resin having a refractive index smaller than that of a first resin forming the ribs.

3. The transmission screen according to claim 1, wherein the shading sheet faces the viewer and the front surface of the shading sheet on the viewer's side is coated with an antireflection layer or a hard coating layer.

4. The transmission screen according to claim 1 wherein a lenticular lens sheet is sandwiched between the shading sheet and the Fresnel lens sheet, the lenticular lens sheet is provided with lenticular lens elements arranged along a direction, and the back surface of the shading sheet on the side of the projection light source and the front surface of the lenticular lens sheet on the viewer's side are adhesively joined together such that the direction along which the lenticular lens elements are arranged and the direction along which the ribs are arranged are perpendicular to each other.

* * * * *